(12) United States Patent
Hirosawa

(10) Patent No.: US 10,715,715 B2
(45) Date of Patent: Jul. 14, 2020

(54) FOCUS DETECTION APPARATUS, METHOD OF CONTROLLING SAME, AND STORAGE MEDIUM

(71) Applicant: CANON KABUSHIKI KAISHA, Tokyo (JP)

(72) Inventor: Tomokuni Hirosawa, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 96 days.

(21) Appl. No.: 15/895,302

(22) Filed: Feb. 13, 2018

(65) Prior Publication Data

US 2018/0234619 A1    Aug. 16, 2018

(30) Foreign Application Priority Data

Feb. 16, 2017  (JP) ................................ 2017-027272

(51) Int. Cl.
*H04N 5/232* (2006.01)
*H04N 5/353* (2011.01)
*G03B 13/36* (2006.01)
*G02B 7/28* (2006.01)

(52) U.S. Cl.
CPC .......... *H04N 5/23212* (2013.01); *G02B 7/28* (2013.01); *G03B 13/36* (2013.01); *H04N 5/232122* (2018.08); *H04N 5/232123* (2018.08); *H04N 5/3535* (2013.01)

(58) Field of Classification Search
CPC ......... H04N 5/23212; H04N 5/232122; H04N 5/232123; H04N 5/3535; G03B 13/32; G03B 13/34; G03B 13/36
See application file for complete search history.

(56) References Cited

U.S. PATENT DOCUMENTS

| | | | | |
|---|---|---|---|---|
| 10,051,217 | B2* | 8/2018 | Kondo | H04N 5/23212 |
| 2013/0002935 | A1* | 1/2013 | Morita | G02B 7/34 |
| | | | | 348/348 |
| 2014/0347532 | A1* | 11/2014 | Kang | H04N 5/351 |
| | | | | 348/294 |
| 2015/0312557 | A1* | 10/2015 | Kim | H04N 5/3535 |
| | | | | 348/46 |
| 2015/0373250 | A1* | 12/2015 | Sfaradi | H04N 5/23212 |
| | | | | 348/345 |
| 2016/0173750 | A1* | 6/2016 | Kyung | H04N 5/23212 |
| | | | | 348/362 |
| 2017/0353679 | A1* | 12/2017 | Negishi | H04N 5/23212 |

FOREIGN PATENT DOCUMENTS

JP    2010-122356 A    6/2010

* cited by examiner

*Primary Examiner* — Daniel M Pasiewicz
(74) *Attorney, Agent, or Firm* — Carter, DeLuca & Farrell LLP

(57) ABSTRACT

A focus detection apparatus, comprising: an image sensor having a plurality of pixels arranged two-dimensionally; a drive control unit configured to cause exposure for accumulation times that differ in respective pixel rows of the image sensor to be performed; and a focus detection unit configured to detect a defocus amount by using a signal obtained from pixels of a line that includes pixels of a plurality of pixel rows, wherein the focus detection unit detects the defocus amount based on accumulation times of pixel rows corresponding to each pixel included in the line.

12 Claims, 9 Drawing Sheets

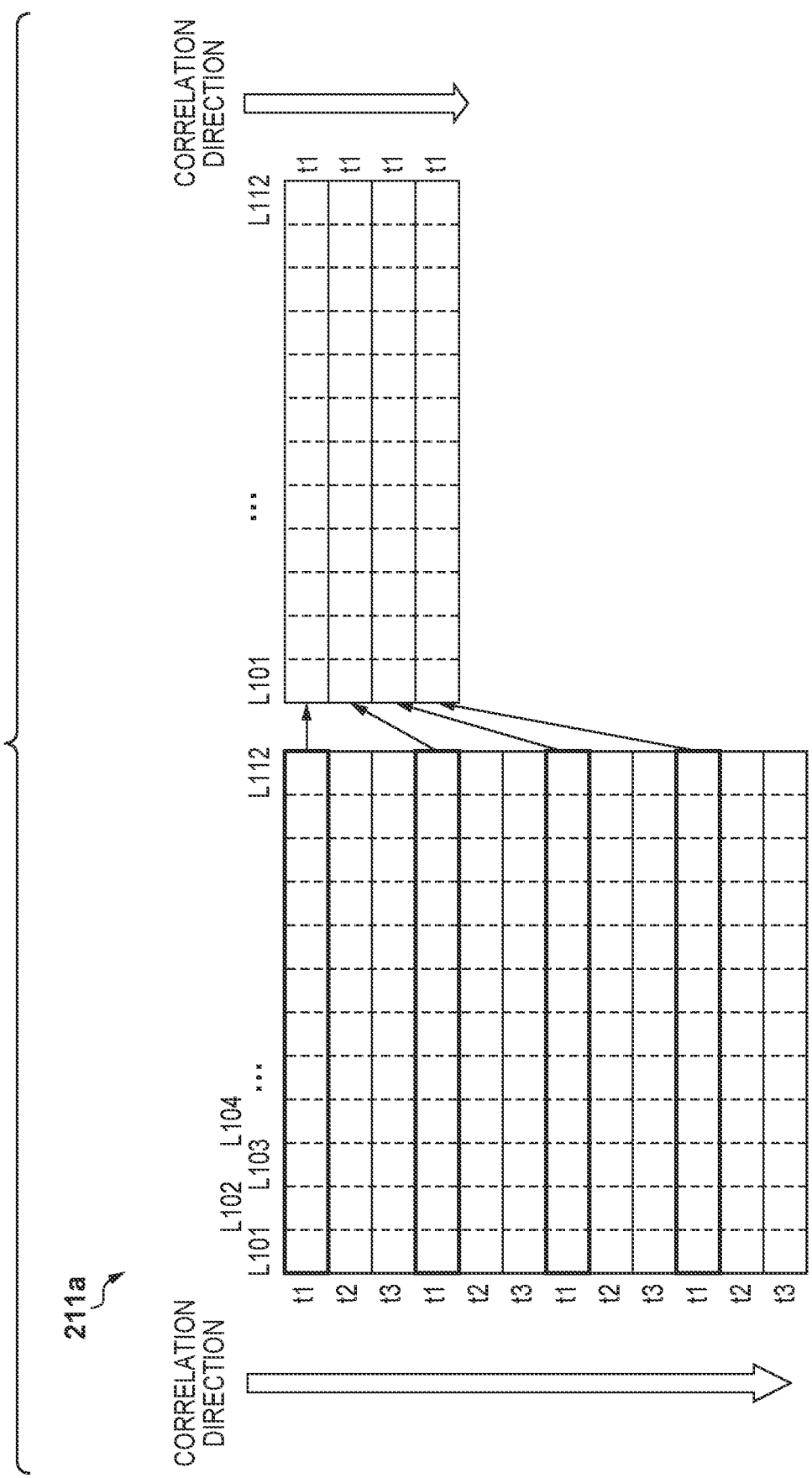

FOCUS DETECTION APPARATUS, METHOD OF CONTROLLING SAME, AND STORAGE MEDIUM

BACKGROUND OF THE INVENTION

Field of the Invention

The present invention relates to a technique for focus detection in an image capturing apparatus.

Description of the Related Art

Conventionally, as a focus detection apparatus in an image capturing apparatus such as a digital camera, a focus detection apparatus of a phase difference detection method is known. In the phase difference detection method, light from an object is separated into two image signals by a separator lens, and a focus state is detected from a phase difference therebetween. In addition, a so-called cross AF apparatus that detects a focus state in a plurality of correlation directions in accordance with a plurality of separator lenses is known. In a cross AF apparatus, it is possible to improve focus detection accuracy because it is possible to detect the contrast of an object in accordance with the plurality of correlation directions.

As a technique relating to focus detection, Japanese Patent Laid-Open No. 2010-122356 discloses a focus detection apparatus that uses a two-dimensional image sensor as a focus detection sensor. In Japanese Patent Laid-Open No. 2010-122356, accumulation control is repeated a plurality of times while an accumulation time is changed, in order to enlarge a signal dynamic range (a D range) of the two-dimensional image sensor. In addition, focus adjustment control that performs a correlation calculation for an image signal obtained in each accumulation time and uses a calculation result having a highest reliability is performed.

However, in the conventional technique disclosed by Japanese Patent Laid-Open No. 2010-122356, because charge accumulation is performed a plurality of times over a plurality of different accumulation times, time required for focus detection processing is large.

Accordingly, a configuration for shortening time required for a focus detection by performing the focus detection processing while enlarging a signal dynamic range by controlling the image sensor by a different accumulation time row by row, can be considered. However, a problem that an appropriate image signal cannot be obtained due to a correlation direction arises.

SUMMARY OF THE INVENTION

The present invention is made in light of the foregoing problem, and provides a focus detection apparatus that can suppress an increase of an amount of time required for a focus detection while enlarging a dynamic range of a sensor for focus detection.

According to a first aspect of the present invention, there is provided a focus detection apparatus, comprising: an image sensor having a plurality of pixels arranged two-dimensionally; a drive control unit configured to cause exposure for accumulation times that differ in respective pixel rows of the image sensor to be performed; and a focus detection unit configured to detect a defocus amount by using a signal obtained from pixels of a line that includes pixels of a plurality of pixel rows, wherein the focus detection unit detects the defocus amount based on accumulation times of pixel rows corresponding to each pixel included in the line.

According to a second aspect of the present invention, there is provided a focus detection apparatus, comprising: an image sensor having a pixel line in which a plurality of pixels for receiving and photo-electrically converting a pair of light beams that passed through differing pupil areas of an imaging optical system are arrayed; a drive control unit configured to cause accumulation times of a plurality of pixel lines in the image sensor to differ each predetermined number of lines; a first calculation unit configured to, after performing compensation processing for compensating for a difference of the accumulation times between lines based on signals of the accumulation times that differ between lines in the same frame in the image sensor, calculate a defocus amount by using the signals after the compensation processing; and a second calculation unit configured to calculate a defocus amount by using a line signal obtained for each of the pixel lines in the image sensor.

According to a third aspect of the present invention, there is provided a method of controlling a focus detection apparatus having an image sensor having a plurality of pixels arranged two-dimensionally, the method comprising: causing exposure for accumulation times that respectively differ in respective pixel rows of the image sensor to be performed; and detecting a defocus amount by using a signal obtained from pixels of a line that includes pixels of a plurality of pixel rows, wherein, in the detection of the defocus amount, the defocus amount is detected based on accumulation times of pixel rows corresponding to each pixel included in the line.

According to a fourth aspect of the present invention, there is provided a method of controlling a focus detection apparatus provided with an image sensor having a pixel line in which a plurality of pixels for receiving and photo-electrically converting a pair of light beams that passed through differing pupil areas of an imaging optical systems are arrayed, the method comprising: causing accumulation times of a plurality of pixel lines in the image sensor to differ each predetermined number of lines; performing, after compensation processing for compensating for a difference of the accumulation times between lines based on signals of the accumulation times that differ between lines in the same frame is performed in the image sensor, a first calculation for calculating a defocus amount by using the signals after the compensation processing; and performing a second calculation for calculating a defocus amount by using a line signal obtained for each of the pixel lines in the image sensor.

Further features of the present invention will become apparent from the following description of exemplary embodiments with reference to the attached drawings.

BRIEF DESCRIPTION OF THE DRAWINGS

FIG. 10 is a view which illustrates line generation according to the second embodiment.

DESCRIPTION OF THE EMBODIMENTS

Hereinafter, referring to the attached drawings, embodiments of the present invention will be described in detail.

A First Embodiment

Figure 1:
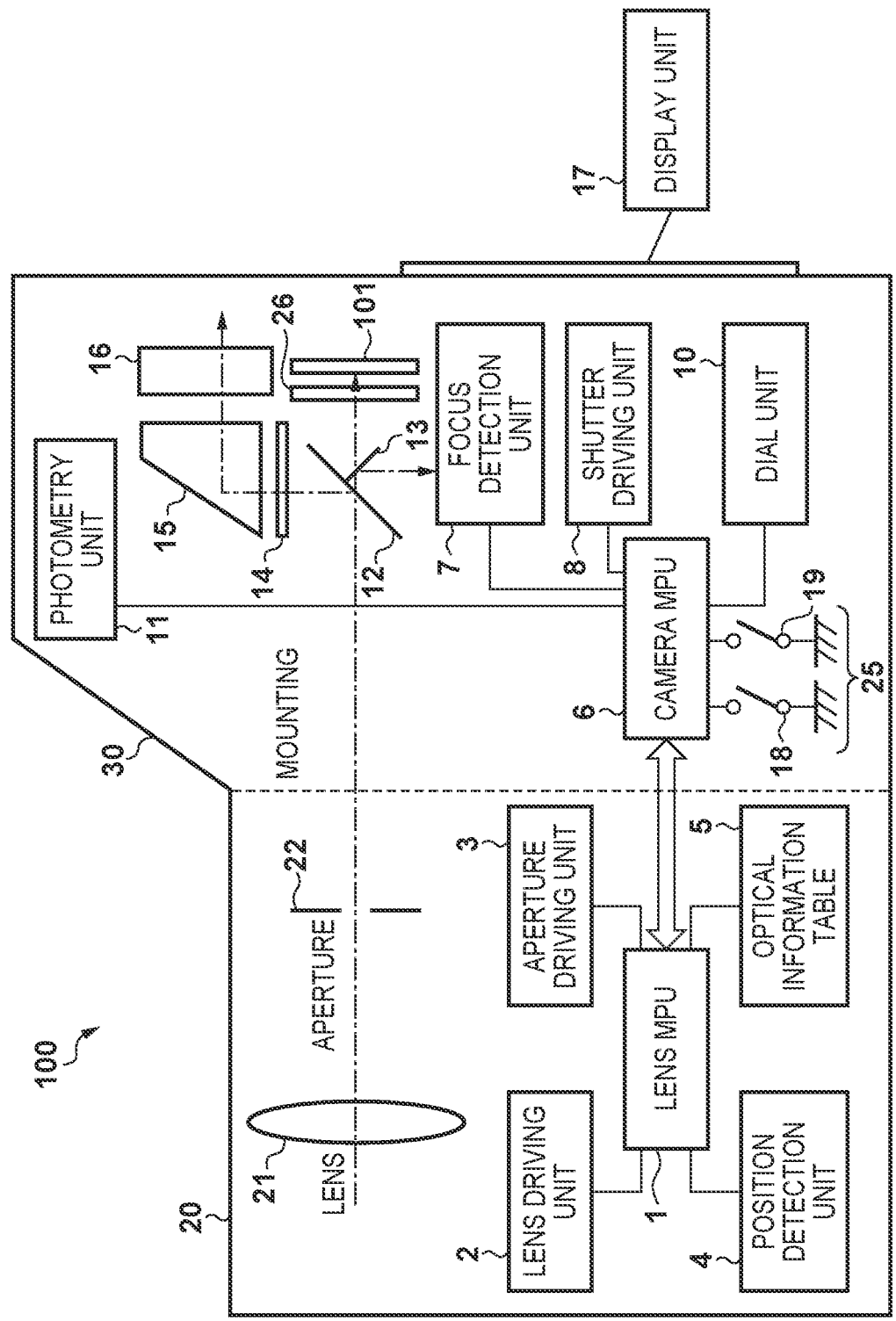
FIG. 1 is a view which illustrates a configuration of a digital camera 100 which is a first embodiment of an image capturing apparatus according to the present invention.

FIG. 1 is a view which illustrates a configuration of a digital camera 100 which is a first embodiment of an image capturing apparatus according to the present invention. In FIG. 1, the digital camera 100 is a lens interchangeable single-lens reflex type camera system, for example. The digital camera 100 is configured by being provided with a camera main body 30 and an image capturing lens unit 20 capable of being attached/detached with respect to the camera main body 30. The image capturing lens unit 20 and the camera main body 30 are configured to be capable of attachment/detachment via a mounting illustrated by a dotted line in the center.

The image capturing lens unit 20 is provided with an image capturing lens 21, an aperture 22, a lens MPU (micro processing unit) 1, a lens driving unit 2, an aperture driving unit 3, a position detection unit 4 for the image capturing lens, and an optical information table 5. The lens MPU 1 performs all calculations and control relating to operation of the image capturing lens unit 20. The lens driving unit 2 is a driving unit for driving the image capturing lens 21 in accordance with control by the lens MPU 1. The aperture driving unit 3 is a driving unit for driving the aperture 22 in accordance with control by the lens MPU 1. The position detection unit 4 for detecting the position of the image capturing lens is a detection unit for detecting the focus position of the image capturing lens. The optical information table 5 is a table of optical information necessary for an automatic focus adjustment, and is stored in a memory or the like (not shown).

The camera main body 30 is provided with a camera MPU 6, a focus detection unit 7, a shutter 26, a shutter driving unit 8, a dial unit 10, and photometry unit 11. In addition, the camera main body 30 is provided with a main mirror 12, a sub mirror 13, a focusing screen 14, a penta mirror 15, a finder 16, an image sensor 101, and a release button 25 having a switch SW1 (18) and a switch SW2 (19). The switch SW1 (18) is turned on by a first stroke (a half press) of the release button 25, and the switch SW2 (19) is turned on by a second stroke (a full press) of the release button 25.

The camera MPU 6 performs all calculations and control relating to operation of the camera main body 30. The camera MPU 6 is connected to the lens MPU 1 via a signal line of the mounting, and obtains lens location information from the lens MPU 1, and obtains optical information unique to each interchangeable lens and lens driving.

In addition, contained in the camera MPU 6 is a ROM storing a program for controlling operation of the camera main body 30, a RAM for storing variables, and an EEPROM (Electrically Erasable Programmable Read-Only Memory) for storing various parameters. Focus detection processing which is described below is executed by the program stored in the ROM. In addition, a display unit 17 displays information relating to a capture mode of the camera, a preview image before capturing, an image for confirming after capturing, or the like.

The focus detection unit 7 is provided with a focus detection sensor, and performs focus detection in accordance with the phase difference detection method. Some of a light beam from an object that is incident via the image capturing lens 21 passes through the main mirror 12, is bent downward by the sub mirror 13 which is rearward of the main mirror 12, and is incident on the focus detection unit 7. In the focus detection unit 7, an image formed on a primary image forming plane is divided into a vertical direction and a horizontal direction by an optical system in the focus detection unit 7 (a separator lens) and forms images on a focus detection sensor 210 (refer to FIG. 2). The divided image signals have similar waveforms that differ by phase.

The focus detection sensor is a two-dimensional CMOS image sensor, and with a configuration where a global electronic shutter is possible and in accordance with a charge accumulation start instruction from the camera MPU 6, performs a circuit reset operation and a photodiode reset operation, and starts a charge accumulation operation. In addition, when the accumulation time that is set row by row from the camera MPU 6 beforehand is reached, the charge accumulated by the photodiode is transferred to a memory unit of a peripheral circuit of the photodiode. In other words, by shifting the transfer timing row by row, it is possible to control the accumulation time for each row. When transfer of charge for all pixels to memory units ends, the end of the charge accumulation is notified to the camera MPU 6. Note that it is also possible to control the accumulation time for each row by shifting the timing of a reset operation for the photodiode and a reset operation for a circuit, in accordance with a rolling shutter operation.

Upon receiving the notification of the end of charge accumulation, the camera MPU 6 reads a signal from the focus detection sensor. The shutter driving unit 8 is a driving unit for driving the shutter 26. The dial unit 10 is an input unit for changing various settings of the camera 100, and can perform for example switching of a continuous shooting speed, a shutter speed, an aperture value, a capture mode, or the like.

The photometry unit 11 is provided with a photometric sensor, and performs photometry processing via the photometric sensor based on a light beam from the penta mirror 15 in accordance with a half-press operation (ON of the switch SW1 (18)) with respect to the release button 25. These are all connected to the camera MPU 6. The photometric sensor comprises a photo-electrical conversion sensor such as a photodiode and a signal processing circuit therefor, performs a signal output regarding a luminance level of an object, and the output signal is inputted to the camera MPU 6. The main mirror 12 has a function of folding upward most of a light beam incident via the image capturing lens unit 20 to form an object image on the focusing screen 14. The object image on the focusing screen 14 is guided to the finder 16 after being reflected and converted to an erected image by the penta mirror 15. By this the finder 16 functions as an optical viewfinder. Some of the light that passes through the penta mirror 15 is guided to the photometry unit 11. When the camera 100 enters an image capturing state, the main mirror 12 and the sub mirror 13 retract from the light path, and the light beam from the object that is incident via the image capturing lens unit 20 is formed on the image sensor 101.

Figure 2:
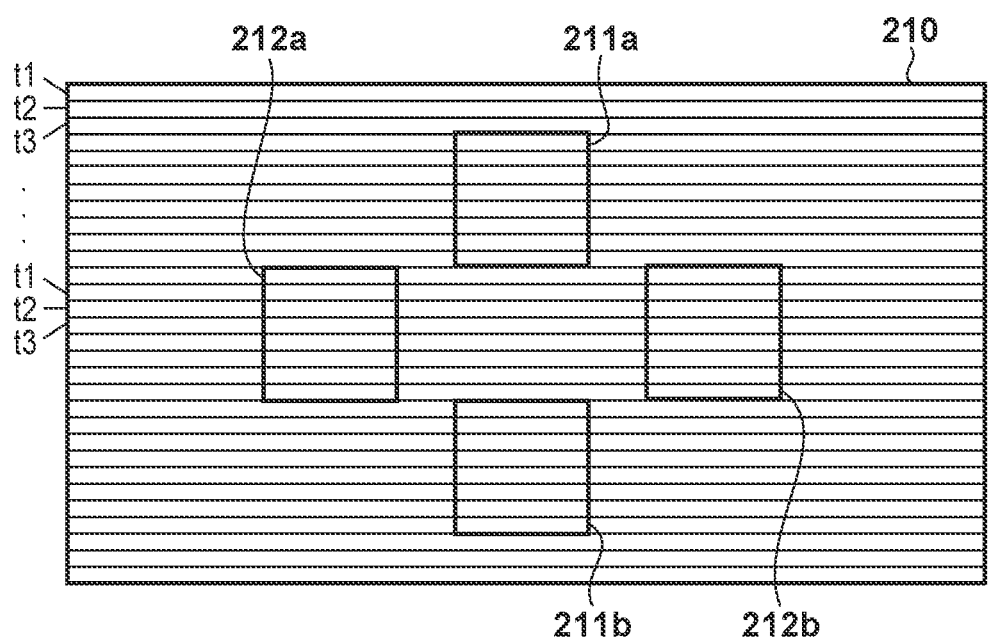
FIG. 2 is a view which illustrates a focus detection sensor.

Next, using FIG. 2, explanation is given regarding the focus detection sensor 210. In the focus detection sensor 210, square pixels configured by a photodiode and a peripheral circuit unit are arrayed (arranged) two-dimensionally. The square pixels are configured so that, in accordance with an instruction from the camera MPU 6, drive control after setting a charge accumulation time (an exposure time) and a read-out gain row by row is possible. Here a horizontal direction is defined as a row, and a vertical direction is defined as a column. In the present embodiment, by changing the charge accumulation time row by row, a luminance range for which focus detection is possible is enlarged. In the focus detection sensor 210, accumulation times are cyclically set for every three rows to accumulation times t1, t2, and t3 in order from a first row. For the length of the accumulation times, let t1<t2<t3.

In FIG. 2, first line groups 211a and 211b are regions for receiving light of an object image resulting from dividing an image of a primary image forming plane in a vertical direction by a separator lens. Image signals (line signals) generated by the first line groups 211a and 211b are regions for detecting contrast in a horizontal direction of an object, and the phase is shifted in the vertical direction in accordance with a focus state. Accordingly, by detecting a phase difference in the vertical direction for respective image signals by a defocus calculation which is described later, it is possible to detect a focus state. Similarly, second line group 212a and 212b are regions for receiving a light beam resulting from dividing an image of a primary image forming plane in a horizontal direction by a separator lens. The image signals generated by the second line groups 212a and 212b have phases that are shifted in the horizontal direction in accordance with the focus state. Accordingly, by obtaining phase differences from image signals generated by both of the first line groups and the second line groups, it is possible to calculate a phase difference from a direction in which it is easy to detect the contrast of the object.

Figure 3A:
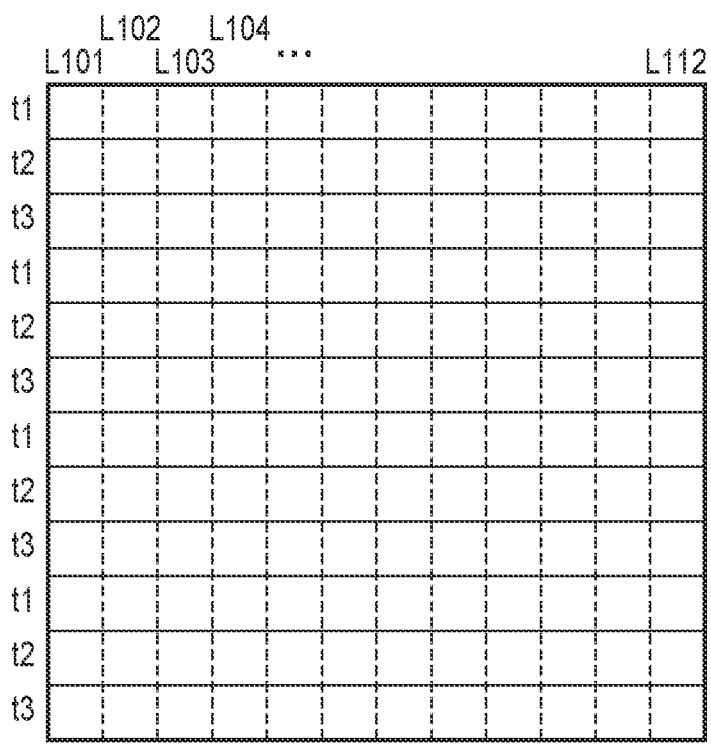
FIGS. 3A and 3B are views which illustrate a first line group and a second line group in the focus detection sensor respectively.
Figure 3B:
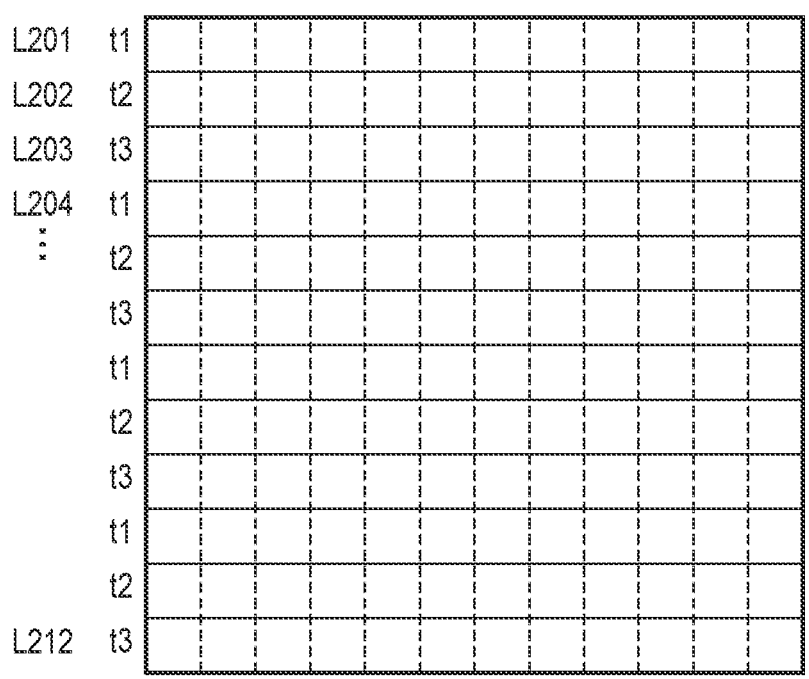

Next, using FIGS. 3A and 3B, explanation is given in detail regarding a first line group and a second line group. FIG. 3A is a view that enlarges the first line group 211a, and FIG. 3B is a view that enlarges the second line group 212a. For the first line group 211a illustrated in FIG. 3A, lines L101 through L112 for performing a correlation calculation in the vertical direction (a direction orthogonal to the line direction) are generated. Accordingly, control is performed so that there is a different accumulation time for each single pixel. In contrast, in the second line group 212a illustrated in FIG. 3B, lines L201 through L212 in the horizontal direction are generated. Control is performed so that pixels in the horizontal direction have the same accumulation time.

Figure 4:
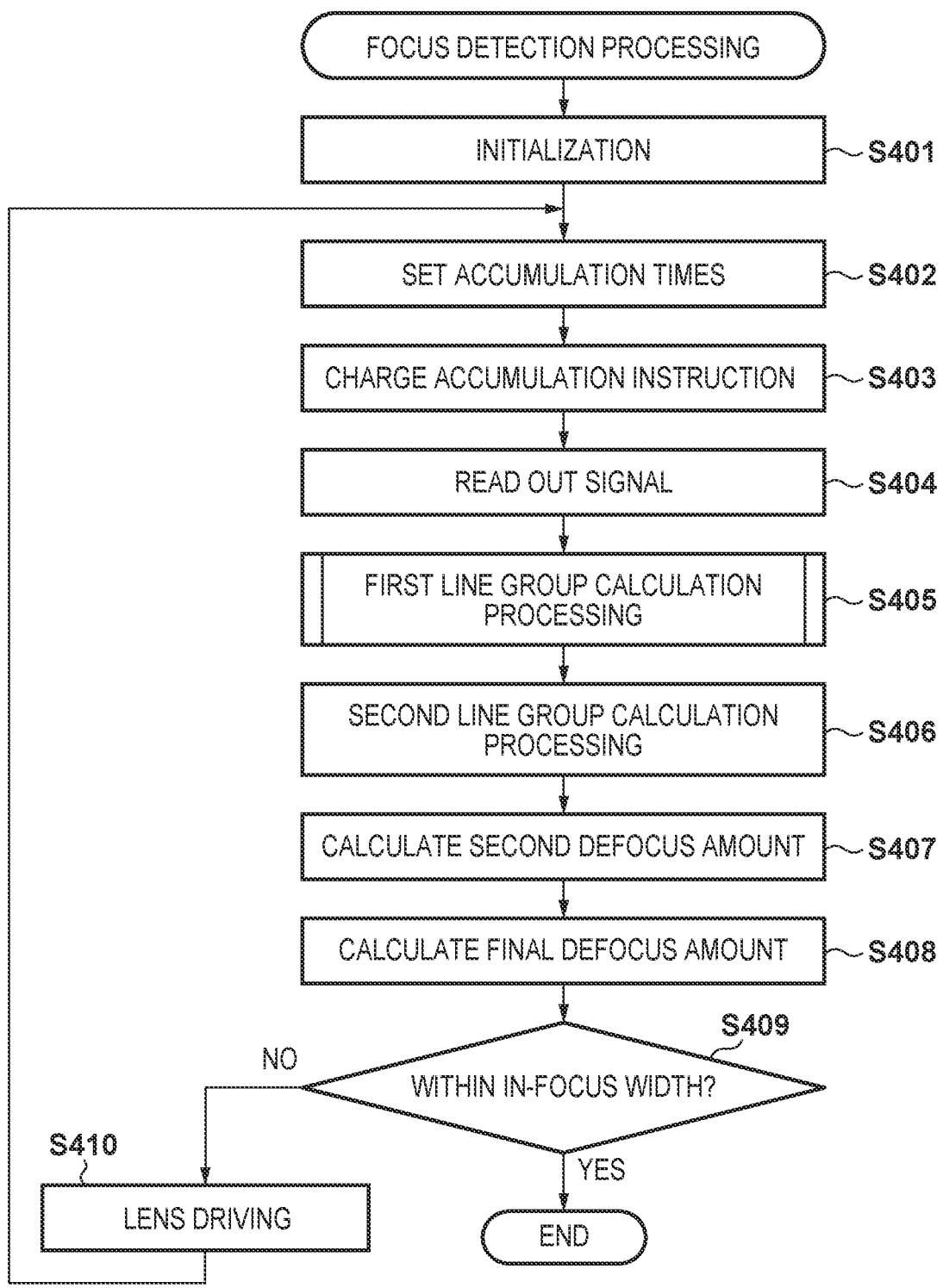
FIG. 4 is a flowchart for describing focus detection processing.

Next, using the flowchart of FIG. 4, explanation is given regarding focus detection processing in the present embodiment. Firstly, in step S401, the camera MPU 6 sets memory content and an execution program to an initial state, and executes a focus detection preparation operation such as a power supply activation of the focus detection sensor 210.

In step S402, the camera MPU 6 sets the accumulation times of the focus detection sensor 210. The camera MPU 6 sets the accumulation time to three types (t1, t2, and t3) for each pixel row. For the length of the charge accumulation times, let t1<t2<t3.

The camera MPU 6 sets the accumulation time t2 as a standard accumulation time. An amount of time such that an average signal of a line is approximately half of saturated signal amount of a pixel unit is made to be the standard accumulation time. The standard accumulation time is decided from a signal amount obtained by focus detection processing of a previous time. Alternatively it may be set to an accumulation time that is decided in advance. However, there are case where a brightness difference in an object is large even after controlling by the standard accumulation time, and there are cases where saturated pixels occur for some of the focus detection sensor 210 that received light from the object. Accordingly, there are cases where it is not possible to correctly obtain the phase of a pair of image signals for focus detection, and focus detection accuracy decreases. Accordingly, by setting the accumulation time of pixels of the focus detection sensor 210 to accumulation times that differ for each row, the D range of the signal is enlarged.

In step S403, the camera MPU 6 instructs the focus detection sensor 210 to start charge accumulation based on the accumulation times decided in step S402. Having received the instruction to start charge accumulation, the focus detection sensor 210, as described above, performs a circuit reset operation and a photodiode reset operation, and accumulates charge based on the accumulation times set in step S402. When the accumulation time for each row reaches the set accumulation time and accumulation of charge ends, the focus detection sensor 210 transmits a charge accumulation completion flag to the camera MPU 6.

In step S404, the camera MPU 6, upon receiving the charge accumulation completion flag in step S403, reads out the signal from the focus detection sensor 210. In step S405, the camera MPU 6 performs calculation processing for the first line group, and calculates a first defocus amount which is described later. Details of the calculation processing for the first line group are described later.

In step S406, the camera MPU 6 performs calculation processing for the second line group.

Figure 5A:
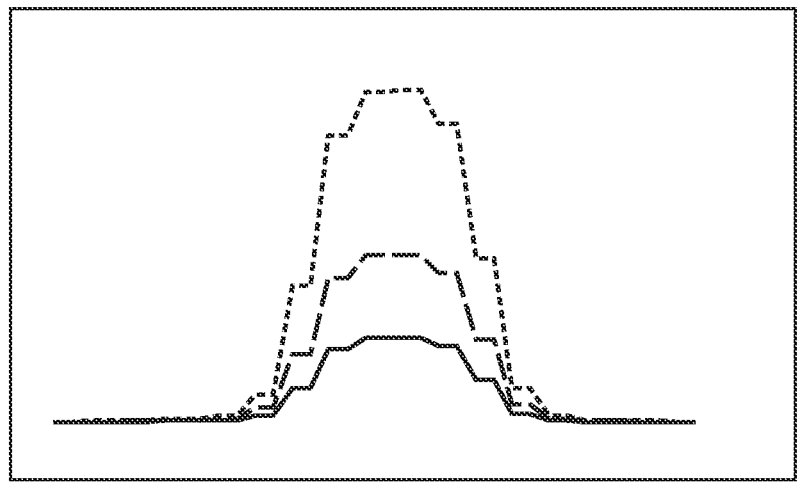
FIGS. 5A to 5C are views for illustrating image signals of the first line group and the second line group.

Using FIG. 5A, explanation is given regarding image signals of the second line group. FIG. 5A illustrates image signals L201 through L203 for three lines controlled by the accumulation times t1, t2, and t3 out of a second line group. L201 indicated by a solid line is an image signal in the case where the accumulation time t1 is set. Similarly, the image signal L202 indicated by the dashed line and the image signal L203 indicated by the dotted line are image signals for the cases where the accumulation time is set to t2 and t3, respectively. In this way, image signals for which the accumulation time is the same in a line have respectively different signal magnitudes across different lines, but are continuous signals.

The camera MPU 6 performs a defocus calculation for the lines L201 through L212 generated from the second line groups 212a and 212b out of the pixels read out in step S404.

The defocus calculation is a publicly known defocus calculation for detecting the focus state (defocus amount) of the image capturing lens 21 by using image signals of the lines L201 through L212 of the second line group 212a and lines of the second line group 212b that correspond thereto. Here, a defocus amount (mm) is obtained by multiplying the phase difference (a number of bits) of the focus detection sensor 210 by an optical coefficient such as a base line length of an auto focus system and a sensor pitch (mm).

In step S407, the camera MPU 6 calculates a second defocus amount from the defocus amount of the second line groups obtained in step S406.

Explanation is given regarding the second defocus amount calculation. The camera MPU 6 sets the second defocus amount by excluding the defocus amount of lines from L201 through L212 where a saturated pixel is present, and performing an averaging process on the defocus amount of normal lines. Here a saturated pixel indicates a pixel where the signal amount is larger than the pixel saturation level.

In step S408, the camera MPU 6 calculates a final defocus amount for detecting the focus state of the image capturing lens 21. In the present embodiment, for example contrast of image signals of each of the first line groups and the second line groups is calculated, and the defocus amount of a line having a high reliability for the image signal is set as the final defocus amount. The calculation of the final defocus amount is not limited to selection of a line having a high reliability, and a defocus amount indicating the closest out of the first defocus amount and the second defocus amount may be obtained.

In step S409, the camera MPU 6 determines whether the focus state of the image capturing lens 21 is in-focus, based on the final defocus amount calculated in step S408. For the determination of whether in-focus or not, in-focus is determined if the defocus amount is within a desired range, for example within $(1/4) \cdot F\delta$ (F: the aperture value of the lens; $\delta$: a constant (20 μm)). For example, if the aperture value F of the lens=2.0, in-focus is determined if the defocus amount is 10 μm or less, and the focus detection operation ends. Meanwhile, if the defocus amount is greater than 10 μm and out-of-focus is determined, transition is made to step S410 in order to align the focus state of the image capturing lens 21 with an in-focus position.

In step S410, the camera MPU 6 transmits the final defocus amount to the lens MPU 1. The lens MPU 1 makes an instruction for lens driving to the image capturing lens 21 based on the final defocus amount. The camera MPU 6 repeats the operations of step S402 through step S410 described above until an in-focus state is determined in step S410. The above is the flow for a series of focus detection operations.

Figure 6:
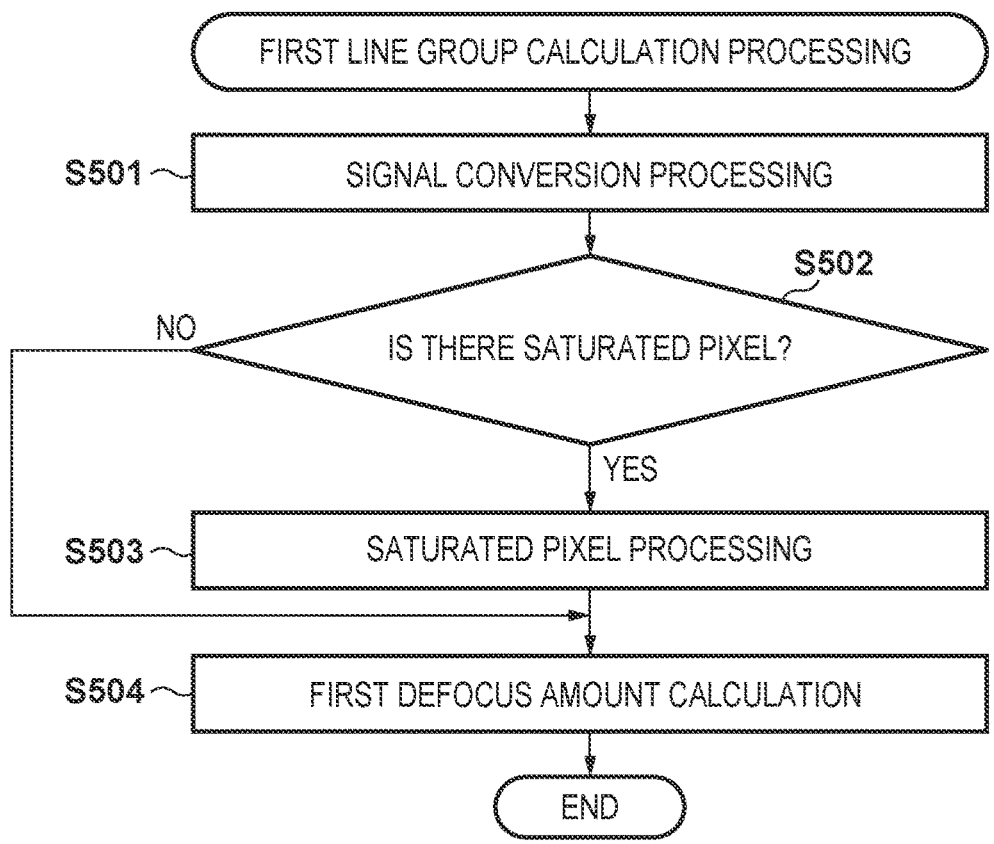
FIG. 6 is a flowchart which illustrates first line group calculation processing in the first embodiment.

Next, using the flowchart of FIG. 6, explanation is given regarding first line group calculation processing. In step S501, the camera MPU 6 generates an image signal for performing a defocus calculation by converting signals of pixels having different accumulation times for the first lines L101 through L112.

Figure 5B:
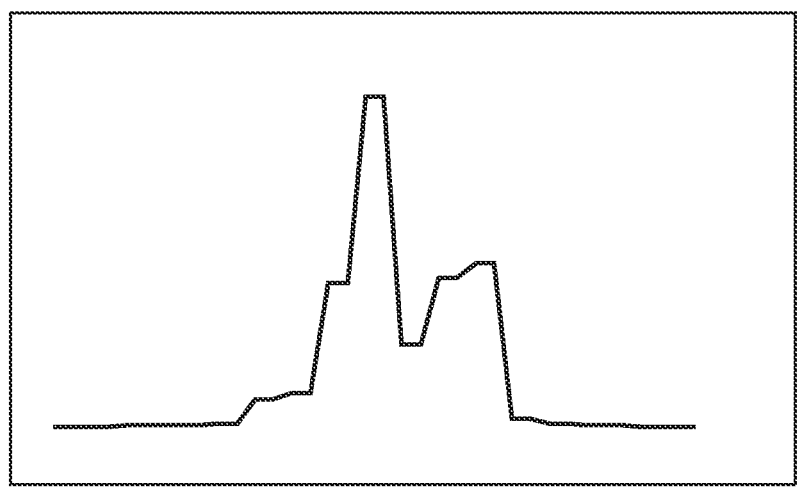

A method of calculating a conversion coefficient used in an image signal conversion is explained in detail using FIG. 5B. FIG. 5B indicates image signals controlled by the accumulation times t1, t2, and t3 that are generated from a first line group. Because pixels having differing accumulation times are mixed in a line, the image signal becomes a discontinuous signal and thus an image signal that differs to that of an object. Accordingly, the camera MPU 6 generates an appropriate continuous image signal by converting the signals which have different accumulation times. Accordingly, the conversion coefficient is calculated based on the accumulation times.

Figure 5C:
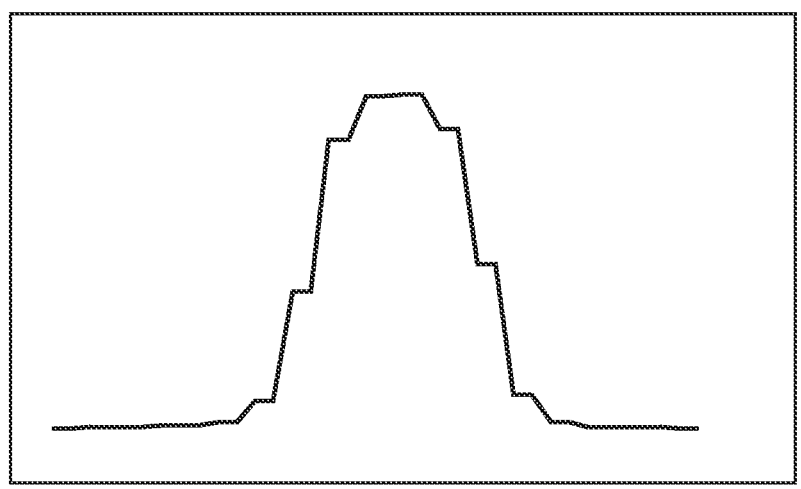

The conversion coefficient is for converting distortion of the image signal due to differences in accumulation times, and is decided based on the accumulation time. Specifically, pixel of t3 which is the longest accumulation time are made to be a reference. To convert signal amounts where the accumulation time is t1 or t2 to signals corresponding to the accumulation time t3, a coefficient of t3/t1 (a value proportional to the reciprocal of the accumulation time) is applied to pixels of the accumulation time t1, and a coefficient of t3/t2 (a value proportional to the reciprocal of the accumulation time) is applied to pixels of the accumulation time t2. The pixels having the longest accumulation time are made to be the reference in order to increase the resolution of the signal. The converted image signal (a converted signal) is illustrated in FIG. 5C. The converted signal becomes an appropriate continuous image signal.

Figure 7A:
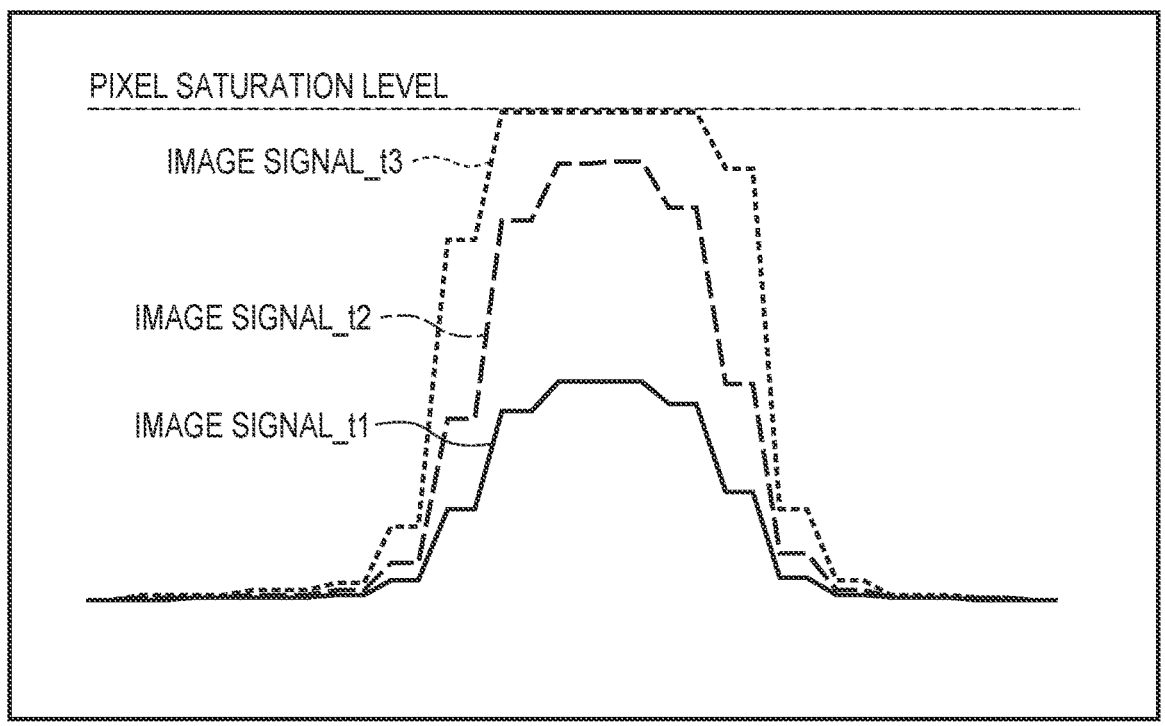
FIG. 7A is a view which illustrates a pixel saturation level.
Figure 7B:
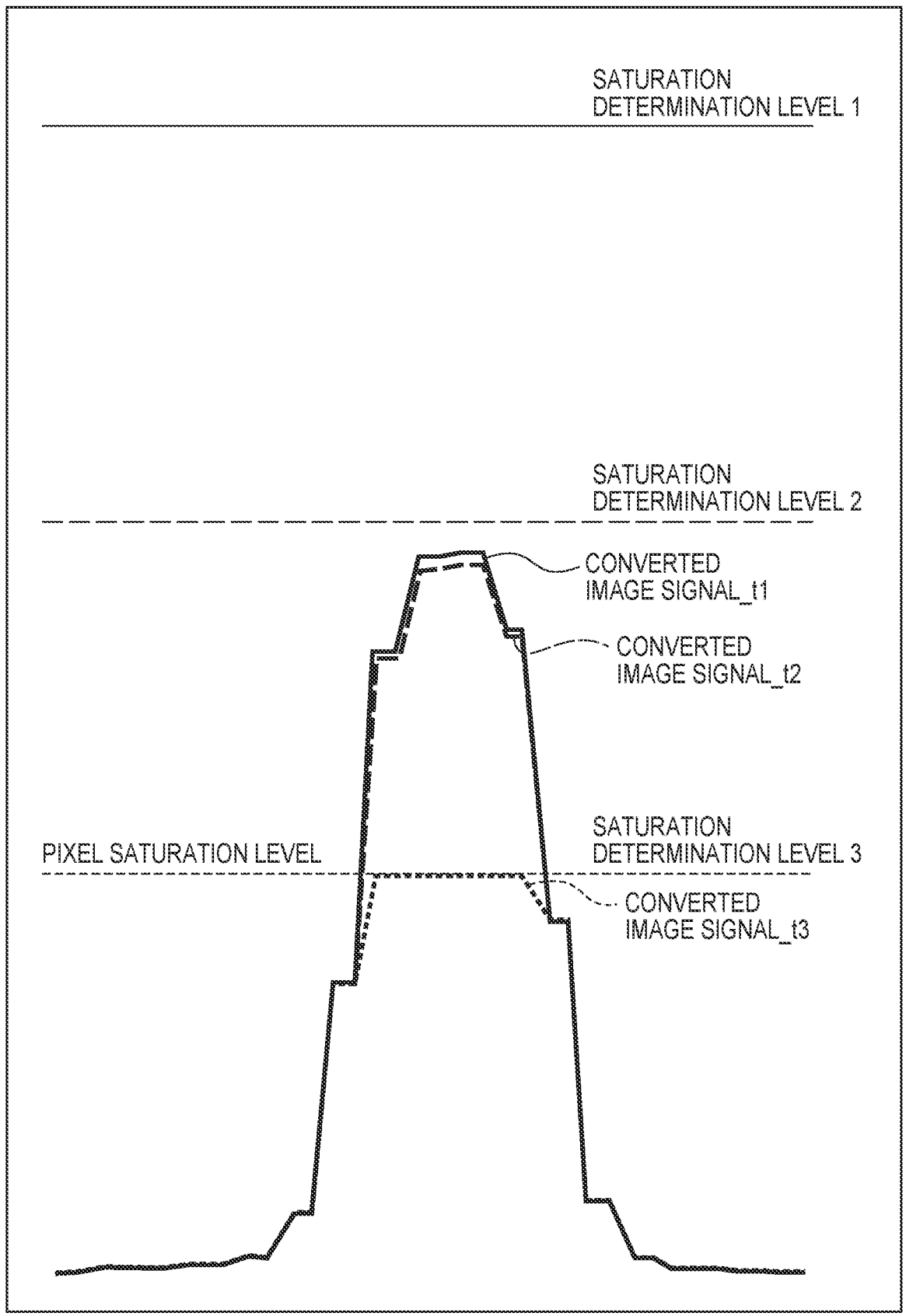
FIG. 7B is a view which illustrates a saturation determination level.

In step S502, the camera MPU 6 detects the above-described saturated pixels in the first line groups, and determines whether there are saturated pixels in a line. Here, FIG. 7A and FIG. 7B are used to give an explanation regarding detection of saturated pixels. Because the image signal is converted, a threshold value for a saturated pixel determination is also converted.

FIG. 7A illustrates the image signal L101, out of the first line groups, before conversion that is controlled by the accumulation times t1, t2, and t3. The solid line indicates an image signal in the case where pixels other than those of the accumulation time t1 are skipped, the dashed line indicates an image signal in the case where pixels other than those of the accumulation time t2 are skipped, and the dotted line indicates an image signal for the case where pixels other than those of the accumulation time t3 are skipped.

Some of the pixels out of pixels set to the accumulation time t3 exceed a pixel saturation level. There are no saturated pixels in the image signals of the accumulation times t1 and t2. FIG. 7B indicates the image signal L101, from the first line groups, after converting the image signals obtained by performing accumulation control by the accumulation times t1, t2, and t3.

The saturation determination levels 1, 2, and 3 indicate saturation determination levels for determining the saturation of pixels of the accumulation times t1, t2, and t3, respectively. The saturation determination level 3 corresponds to an image signal of the accumulation time t3, and because it is not converted, it is the same as the original pixel saturation level. In contrast, the saturation determination level 2 corresponds to a converted image signal of the accumulation time t2, and thus is a threshold value resulting from multiplying the original pixel saturation level by t3/t2. Similarly, the saturation determination level 1 is a threshold value resulting from multiplying the original pixel saturation level by t3/t1.

In this way, the saturation determination level for image signals of respective accumulation times are provided, and a saturated pixel determination is performed. Based on the saturated pixel determination, in a case where there is a saturated pixel in the first line groups L101 through L112, the processing transitions to step S503, and processing is performed for the saturated pixel. Meanwhile, in the case where there are no saturated pixels in the lines, the processing transitions to step S504.

In step S503, the camera MPU 6 performs processing regarding the saturated pixel. Specifically, the camera MPU 6 performs an interpolation from signals before and after a location where the saturated pixel occurred.

Figure 8A:
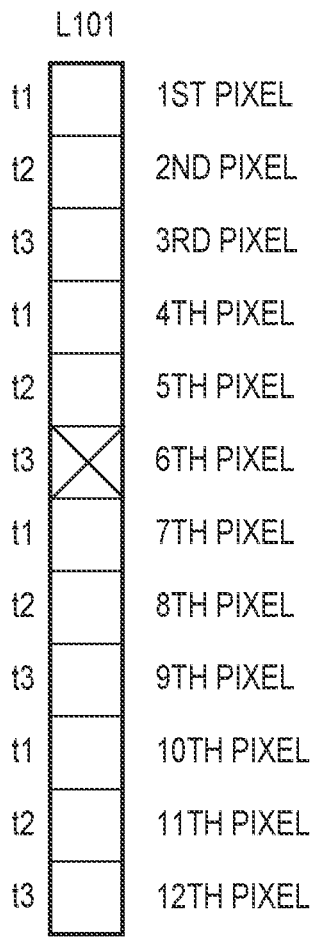
FIGS. 8A and 8B are views which illustrate interpolation processing for a saturated pixel.
Figure 8B:
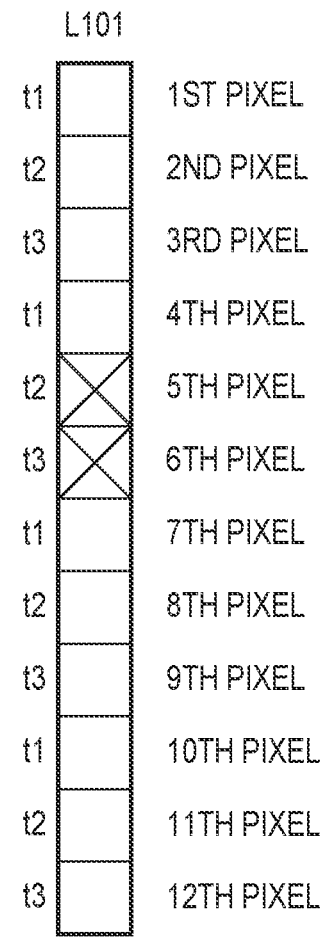

Using FIGS. 8A and 8B, explanation is given regarding processing for interpolating a saturated pixel. Pixels indicated by x are saturated pixels. FIG. 8A is a view illustrating a state in which the sixth pixel of the accumulation time t3 is saturated. The sixth pixel is interpolated from the signals of the fifth and seventh pixels (nearby pixels). The interpolated signal is a linear interpolation from the signals of the fifth and seventh pixels after the conversion in step S501 of FIG. 6. FIG. 8B is a view illustrating a state in which the fifth and the sixth pixels are saturated. In this case, interpolation processing is performed by linearly or nonlinearly interpolating the signals of the fifth and the sixth pixels from the fourth and the seventh pixels. The above was an explanation regarding the method for interpolating a saturated pixel.

In step S504, the camera MPU 6 calculates a first defocus amount based on the image signals converted in step S501 or an image signal for which a saturated pixel is interpolated in step S503. A defocus amount calculated by a defocus calculation in accordance with the method described above is set as the first defocus amount.

As described above, in the present embodiment, in first line group calculation processing, for a line in which there are pixels with different accumulation times, the image signal is converted by applying a conversion coefficient based on the accumulation time for a respective pixel signal, and a defocus calculation is performed based on the converted image signal. Accordingly, it is possible to perform a focus detection in a wide luminance range even in a scene where luminance greatly differs in accordance with a location—even for the same object—and saturated pixels occur. It is thus possible to perform focus detection processing with a high accuracy.

In the present embodiment, explanation was given for a focus detection apparatus that enabled focus detection by a plurality of correlation directions, even for a case where a focus detection sensor is controlled by a different accumulation time for each row. Note that, in the embodiment described above, explanation was given regarding a method for performing focus detection processing that uses a dedicated focus detection sensor, but the present invention is not limited to this, and application can also be made to focus detection that uses the image sensor 101 instead of a dedicated focus detection sensor.

Second Embodiment

In the first embodiment, explanation was given for a method of generating an image signal by converting pixels having different accumulation times, as a method for first line group calculation processing of step S405 of FIG. 4. In the second embodiment, explanation is given regarding a method for performing a defocus calculation that extracts pixels having the same accumulation time to generate a line having the same accumulation time, as a different image signal generation method. Regarding focus detection processing and a camera configuration in the present embodiment, it is the same as the detail explained in the first embodiment, and explanation thereof is omitted.

Figure 9:
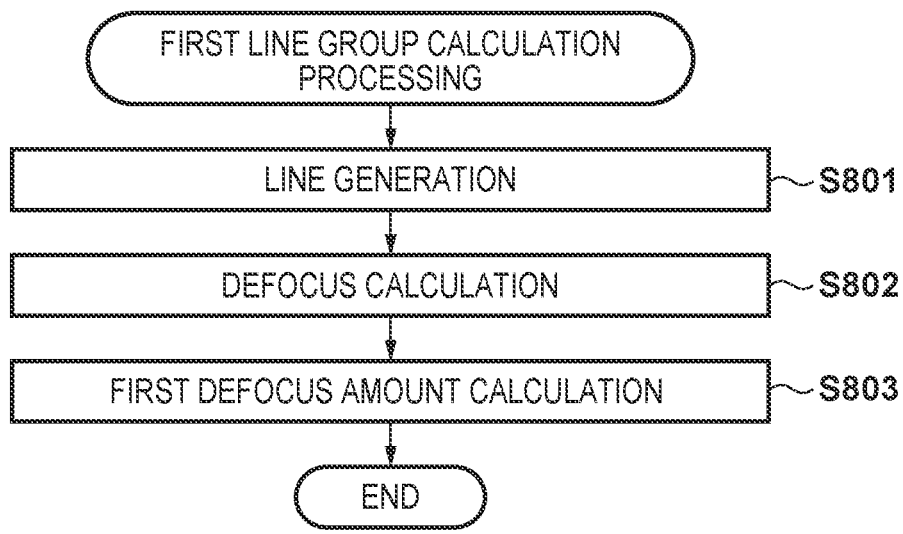
FIG. 9 is a flowchart which illustrates first line group calculation processing in a second embodiment.

Using FIG. 9, explanation is given regarding a method for calculating the defocus amount of first line groups in the second embodiment.

In step S801, the camera MPU 6 extracts pixels controlled by the same accumulation time, and generates lines. Using FIG. 10, explanation is given regarding lines extracted and generated for each accumulation time, with respect to a first line group.

FIG. 10 illustrates lines generated by extracting pixels of the accumulation time t1. In FIG. 10, illustration is given for lines extracted for the accumulation time t1, but lines are similarly extracted and generated for t2 and t3. Accordingly, lines for three types of accumulation times are generated in L101, for example. In addition, for the generated line, pixels of one type of accumulation time are extracted from the pixels of the three types of accumulation times, and thus the resolution becomes ⅓.

In step S802, the camera MPU 6 obtains three types of defocus amounts by the same calculation method as in step S504 of FIG. 6, with respect to each image signal generated in step S801. In step S803, the camera MPU 6 calculates a first defocus amount by performing an averaging process on the three types of defocus amounts obtained in step S802.

In a case where there is a saturated pixel, which is described above, in a line calculated in step S801, the line in which the saturated pixel is present is removed, and an average value of lines for which appropriate accumulation was performed is set as the first defocus amount.

Explanation is thus given for advantageous embodiments of the present invention, but the present invention is not limited to these embodiments, and various variations and changes are possible within the scope of the spirit of the invention.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-027272, filed Feb. 16, 2017, which is hereby incorporated by reference herein in its entirety.

What is claimed is:

1. A focus detection apparatus, comprising:
   an image sensor having a pixel line in which a plurality of pixels for receiving and photo-electrically converting a pair of light beams that passed through differing pupil areas of an imaging optical system are arrayed; and
   at least one processor or circuit configured to function as following units:
   a drive control unit configured to cause accumulation times of a plurality of pixel lines in the image sensor to differ each predetermined number of lines;
   a first calculation unit configured to, after performing compensation processing for compensating for a difference of the accumulation times between lines based on signals of the accumulation times that differ between lines in the same frame, calculate a defocus amount by using the signals after the compensation processing, wherein the first calculation unit calculates a defocus amount corresponding to a first correlation direction by using signals of pixels arrayed in the first correlation direction, in accordance with a focusing status; and a second calculation unit configured to calculate a defocus amount corresponding to a second correlation direction by using signals of pixels arrayed in the second correlation direction, in accordance with a focusing status.

2. The focus detection apparatus according to claim 1, wherein the drive control unit causes exposure of the accumulation times that differ in respective pixel rows of the image sensor to be performed.

3. The focus detection apparatus according to claim 1, wherein the first calculation unit generates a converted signal resulting from applying a conversion in which a gain proportional to the reciprocal of the accumulation time is applied to a signal obtained from respective pixel row of the photo-electrical conversion unit, and uses the converted signal to calculate the defocus amount.

4. The focus detection apparatus according to claim 1, wherein the signals used in the second calculation unit is configured from signals of pixels having the same accumulation time.

5. The focus detection apparatus according to claim 1, wherein the second correlation direction is different from the first correlation direction.

6. The focus detection apparatus according to claim 5, wherein the second correlation direction is a direction in which the pixel rows extend, and the first correlation direction is a direction orthogonal to the first correlation direction.

7. The focus detection apparatus according to claim 5, wherein, if there is a saturated pixel in the pixels arrayed in the first correlation direction, the first calculation unit interpolates a signal of the saturated pixel by using signals of pixels near the saturated pixel.

8. The focus detection apparatus according to claim 5, wherein, if there is a saturated pixel in the pixels arrayed in the second correlation direction, the second calculation unit uses signals of pixels exposed by an accumulation time differing to the accumulation time of the saturated pixel, out of pixels arrayed in the second correlation direction, in the calculation of the defocus amount.

9. The focus detection apparatus according to claim 5, wherein the first calculation unit calculates the defocus amount by using signals of pixels of the same accumulation time, out of the pixels arrayed in the first correlation direction.

10. The focus detection apparatus according to claim 1, wherein the image sensor is arranged at a position where images which are focused on a primary image forming plane by the imaging optical system and divided in row and column direction by a separator lens are formed.

11. A method of controlling a focus detection apparatus provided with an image sensor having a pixel line in which a plurality of pixels for receiving and photo-electrically converting a pair of light beams that passed through differing pupil areas of an imaging optical systems are arrayed, the method comprising:

causing accumulation times of a plurality of pixel lines in the image sensor to differ each predetermined number of lines;

performing, after compensation processing for compensating for a difference of the accumulation times between lines based on signals of the accumulation times that differ between lines in the same frame is performed, a first calculation for calculating a defocus amount by using the signals after the compensation processing, wherein in the first calculation, a defocus amount corresponding to a first correlation direction is calculated by using signals of pixels arrayed in the first correlation direction, in accordance with a focusing status; and performing a second calculation for calculating a defocus amount corresponding to a second correlation direction by using signals of pixels arrayed in the second correlation direction, in accordance with a focusing status.

12. A non-transitory computer-readable storage medium storing a program for causing a computer to execute each step of a method of controlling a focus detection apparatus provided with an image sensor having a pixel line in which a plurality of pixels for receiving and photo-electrically converting a pair of light beams that passed through differing pupil areas of an imaging optical systems are arrayed, the method comprising:

causing accumulation times of a plurality of pixel lines in the image sensor to differ each predetermined number of lines;

performing, after compensation processing for compensating for a difference of the accumulation times between lines based on signals of the accumulation times that differ between lines in the same frame is performed, a first calculation for calculating a defocus amount by using the signals after the compensation processing, wherein in the first calculation, a defocus amount corresponding to a first correlation direction is calculated by using signals of pixels arrayed in the first correlation direction, in accordance with a focusing status; and performing a second calculation for calculating a defocus amount corresponding to a second correlation direction by using signals of pixels arrayed in the second correlation direction, in accordance with a focusing status.

* * * * *